US009116266B2

(12) United States Patent     (10) Patent No.: US 9,116,266 B2
Nakai et al.     (45) Date of Patent: Aug. 25, 2015

(54) LIGHT-EMITTING ELEMENT AND DISPLAY DEVICE USING THE SAME

(75) Inventors: Yutaka Nakai, Yokohama (JP); Tsuyoshi Hioki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 183 days.

(21) Appl. No.: 13/428,556

(22) Filed: Mar. 23, 2012

(65) Prior Publication Data

US 2012/0176811 A1    Jul. 12, 2012

Related U.S. Application Data

(63) Continuation of application No. PCT/JP2009/004790, filed on Sep. 24, 2009.

(51) Int. Cl.
    *G02B 6/00*          (2006.01)
    *F21V 8/00*          (2006.01)

(52) U.S. Cl.
    CPC ............ *G02B 6/0031* (2013.01); *G02B 6/0036* (2013.01); *G02B 6/0076* (2013.01); *G02B 6/0078* (2013.01)

(58) Field of Classification Search
CPC ...... G02B 6/00; G02B 6/0075; G02B 6/0078; G02B 6/0031; G02B 6/0036; G02F 1/13357; G09F 9/33; G09F 9/37; F21S 2/00
USPC .................. 362/551, 554, 582, 615, 616, 628
See application file for complete search history.

(56) References Cited

U.S. PATENT DOCUMENTS

| | | | | |
|---|---|---|---|---|
| 6,139,176 A | * | 10/2000 | Hulse et al. | 362/551 |
| 7,236,663 B2 | * | 6/2007 | Wakita et al. | 362/615 |
| 7,764,334 B2 | * | 7/2010 | Kitagawa et al. | 362/616 |
| 2006/0034566 A1 | | 2/2006 | Wakita et al. | |

(Continued)

FOREIGN PATENT DOCUMENTS

| | | |
|---|---|---|
| JP | 2001-92370 | 4/2001 |
| JP | 2001-92370 A | 4/2001 |
| JP | 2004-103284 | 4/2004 |

(Continued)

OTHER PUBLICATIONS

International Search Report mailed on Feb. 16, 2010, issued for International Application No. PCT/JP2009/004790, filed on Sep. 24, 2009 (English).

(Continued)

*Primary Examiner* — Y M Lee
(74) *Attorney, Agent, or Firm* — Oblon, McClelland, Maier & Neustadt, L.L.P.

(57) ABSTRACT

A light-emitting element includes: a light source; a light guide member having a columnar shape and comprising a plurality of side surfaces containing a pair of parallel total reflection principal surfaces and other surfaces than the total reflection principal surfaces, an upper bottom surface disposed so that light from the light source reaches the total reflection principal surfaces, and a lower bottom surface disposed opposite to the upper bottom surface; clad portions provided on the other side surfaces of the light guide member than the total reflection principal surfaces, the clad portions having a smaller refractive index than that of the light guide member; and a light extraction portion provided on one part of the total reflection principal surfaces.

8 Claims, 10 Drawing Sheets

(56) References Cited

U.S. PATENT DOCUMENTS

| | | | |
|---|---|---|---|
| 2007/0189667 | A1 | 8/2007 | Wakita et al. |
| 2012/0207431 | A1 | 8/2012 | Nakai et al. |

FOREIGN PATENT DOCUMENTS

| | | |
|---|---|---|
| JP | 2005-071928 | 3/2005 |
| JP | 2006-108045 | 4/2006 |
| JP | 2009-158201 | 7/2009 |
| WO | 2004/042449 | 5/2004 |
| WO | WO 2004/042449 A1 | 5/2004 |

OTHER PUBLICATIONS

International Written Opinion mailed on Feb. 16, 2010, issued for International Application No. PCT/JP2009/004790, filed on Sep. 24, 2009.

Office Action issued Apr. 19, 2013 in Japanese Application No. 2011-532783 (With English Translation).

Notification of reasons for Refusal issued Nov. 21, 2012 in Patent Application No. 2011-532783 (with English translation).

Office Action issued Oct. 24, 2014, in Japanese Patent Application No. 2011-532783 (with English-language Translation).

Office Action issued Oct. 4, 2013, in Japanese Patent Application No. 2011-532783 (with English-language Translation).

\* cited by examiner

FIG. 10B ively while reflected totally. For example, there has been

LIGHT-EMITTING ELEMENT AND DISPLAY DEVICE USING THE SAME

CROSS-REFERENCE TO RELATED APPLICATION(S)

This is a Continuation Application of PCT Application No. PCT/JP2009/004790, filed on Sep. 24, 2009, which was published under PCT Article 21(2) in Japanese, the entire contents of which are incorporated herein by reference.

FIELD

The present invention relates to a light-emitting element and a display device using the same.

BACKGROUND ART

If a support member for fixing position is in contact with one part of a light guide member, there is a possibility that light will not be propagated through the light guide member efficiently in accordance with the position of the support member because light leaks from a side surface of the light guide member or the angle of total reflection in a side surface of the light guide member changes at a place where the support member is in contact with the light guide member.

There is hence known a light guide member which is configured so that a clad portion using a material relatively large in refractive index difference from the light guide member is provided as a support member in parallel to a travelling direction of light so that light can travel in the light guide member uniformly while reflected totally. For example, there has been known a display device which has a clad portion provided on a side surface of a waveguide, and an actuator provided in the clad portion and in which the shape of the side surface of the waveguide is changed to thereby extract light to the outside of the waveguide from the side surface of the waveguide in which the actuator is provided.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

Embodiments of the invention will be described below with reference to the drawings.

Example 1

Figure 1:
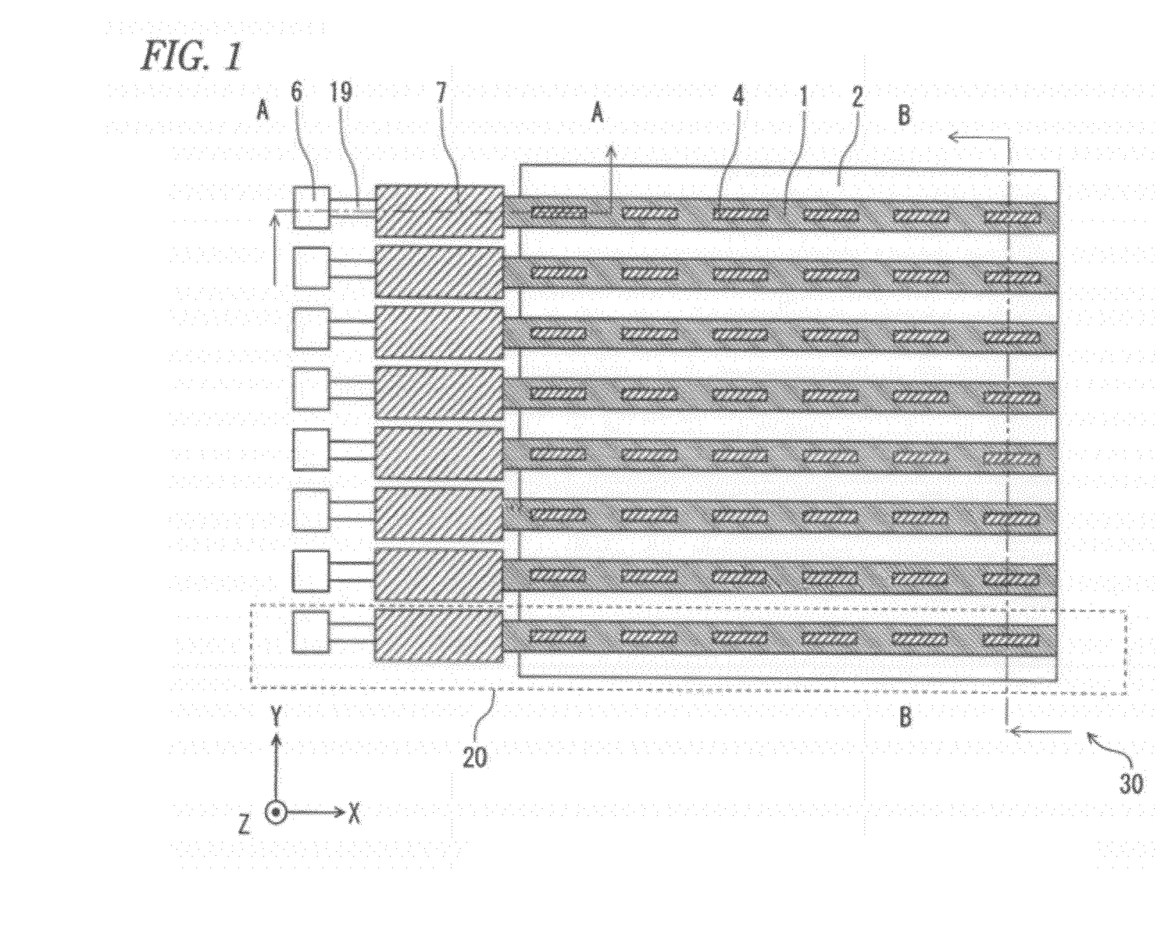
FIG. 1 is a plan view showing a light-emitting element according to Example 1 of the invention.
Figure 2A:
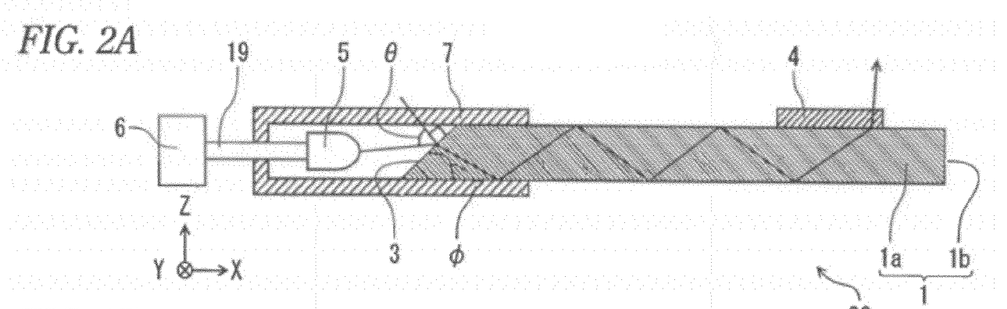
FIG. 2A is a view showing a section of the optical element cut along the line A-A in FIG. 1.
Figure 2B:
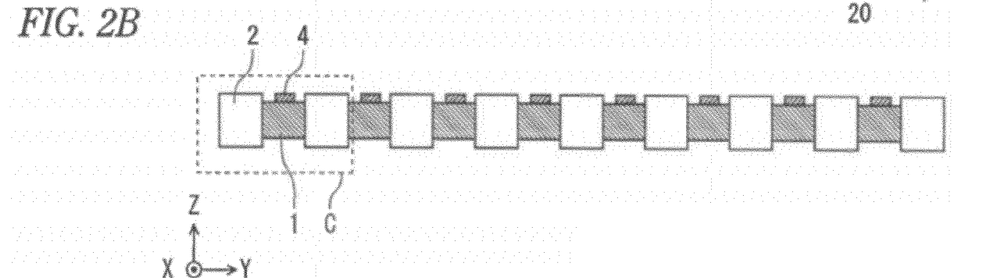
FIG. 2B is a view showing a section of the optical element cut along the line B-B in FIG. 1.
Figure 2C:
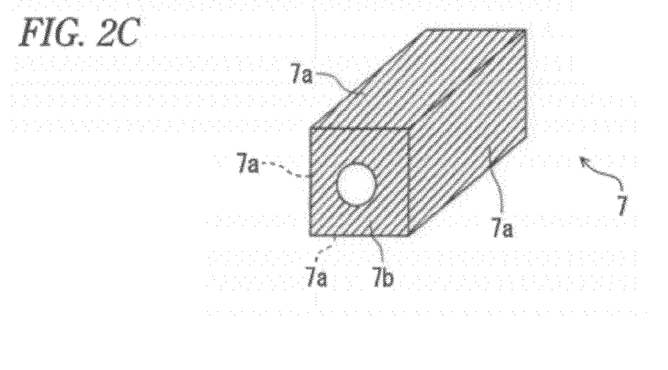
FIG. 2C is an enlarged view showing a pipe of the optical element in FIG. 1.
Figure 3:
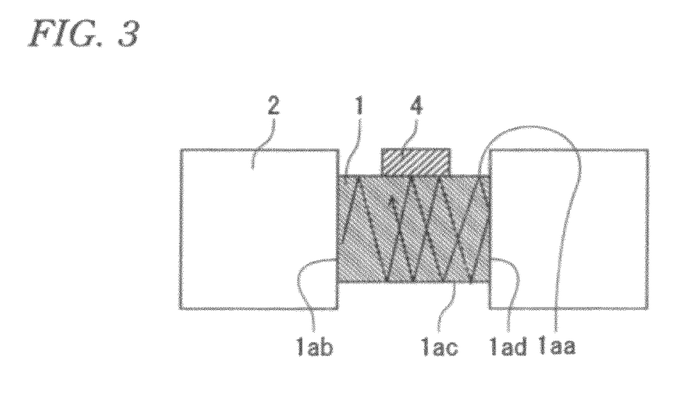
FIG. 3 is an enlarged view showing a portion C surrounded by the broken line in FIG. 2B.

A light-emitting element according to Example 1 of the invention will be described below with reference to FIGS. 1 to 5B. FIG. 1 is a plan view showing an optical element according to Example 1 of the invention. FIG. 2A is a view showing a section of the optical element cut along the line A-A in FIG. 1. FIG. 2B is a view showing a section of the optical element cut along the line B-B in FIG. 1. FIG. 3 is an enlarged view showing a portion C surrounded by the broken line in FIG. 2B. FIG. 2C is an enlarged view showing a pipe of the optical element in FIG. 1.

As shown in FIG. 1, the optical element 30 has a plurality of units 20 arranged in one direction. Each unit 20 has a power source 6, a light source 5 (shown in FIG. 2A) connected to the power source 6 by a connection member 19, a pipe 7 with which the light source 5 is covered, a rectangular column-shaped light guide member 1 connected to the pipe 7, clad portions 2 provided on a pair of side surfaces of the light guide member 1, and a plurality of light extraction portions 4 provided on another side surface of the light guide member 1. One light guide member 1 is put between two clad portions 2.

The power source 6 outputs electric power through the connection member 19 in order to turn on the light source 5. The light source 5 emits light when supplied with electric power from the power source 6. In Example 1, the light source 5 is a light-emitting diode (LED). The light source 5 emits light spreading conically within a predetermined angle. The full width at half maximum expressing the range of conically spreading light with respect to a center line is 20 degrees. That is, light of the light source 5 is emitted in a conical range at 20 degrees with respect to a center line.

As shown in FIG. 2C, the pipe 7 is shaped like a box having four side surfaces 7a and one bottom surface 7b. The inside surrounded by the side surfaces 7a and the bottom surface 7b of the pipe 7 is hollow. A section parallel to the bottom surface 7b of the pipe 7 is rectangular. A section of the inner hollow portion surrounded by the four side surfaces 7a of the pipe 7 is rectangular too. The pipe 7 is made of a material having an inner wall on which light emitted from the light source 5 is reflected so efficiently as to be incident on the light guide member 1. In Example 1, the material of the pipe 7 is aluminum. The pipe 7 is disposed so that the four side surfaces 7a are parallel to the center line of the light emitting direction of the light source 5. The bottom surface 7b of the pipe 7 is disposed on a side of the side surfaces 7a near to the power source 6. A hole is formed in the bottom surface 7b of the pipe 7. The connection member 19 passes through this hole to thereby connect the power source 6 provided outside the pipe 7 to the light source 5 provided inside the pipe 7.

The light guide member 1 guides light to a position far from the light source 5 when light emitted from the light source 5 is incident on the light guide member 1. As shown in FIG. 3, the light guide member 1 in Example 1 is shaped like a rectangular column. The light guide member 1 has four side surfaces 1*a* (1*aa*, 1*ab*, 1*ac* and 1*ad*) and two rectangular bottom surfaces (lower bottom surface 1*b* and upper bottom surface 3 (light incidence surface)). The major axis direction of the light guide member 1 (the direction commonly parallel to the four side surfaces 1*a* of the light guide member 1) is parallel to the major axis direction of the pipe 7 (the direction commonly parallel to the four side surfaces 7*a* of the pipe 7). A section of the light guide member 1 is shaped like a rectangle which is substantially the same as a section of the hollow portion surrounded by the four side surfaces 7*a* of the pipe 7. A part of the light guide member 1 is covered with the pipe 7 to thereby connect the light guide member 1 and the pipe 7 to each other. The part of the light guide member 1 covered with the pipe 7 is in contact with the inner wall of the side surfaces 7*a* of the pipe 7. Because a part of the light guide member 1 is covered with the pipe 7, light emitted from the light source 5 does not leak from the connection portion between the pipe 7 and the light guide member 1 but enters the light guide member 1.

Of the two bottom surfaces (the lower bottom surface 1*b* and the light incidence surface 3) of the light guide member 1, the lower bottom surface 1*b* far from the power source 6 is perpendicular to the four side surfaces 1*a*. On the other hand, the upper bottom surface 3 near to the power source 6 is inclined with respect to the direction perpendicular to the four side surfaces 1*a*. The lower bottom surface 1*b* of the light guide member 1 is a specular surface which reflects light toward the inside of the light guide member 1. The lower bottom surface 1*b* and the light incidence surface 3 (specular surface) are not parallel to each other.

The center line of conical light emitted from the light source 5 is parallel to the major axis direction of the light guide member 1.

Light incoming from the light incidence surface 3 is propagated through the light guide member 1 while total reflection mainly on the side surfaces (1*aa* and 1*ac*) is repeated.

Assume here that the major axis direction parallel to the side surfaces of the light guide member 1 is an x direction, the vertical direction in FIG. 1 perpendicular to the x direction is a z direction, and the direction (depth direction in FIG. 1) perpendicular to the x and z directions is a y direction. Of the four side surfaces 1*a* of the light guide member 1, the two side surfaces (total reflection principal surfaces 1*aa* and 1*ac*) form an xy plane, and the other two side surfaces (1*ab* and 1*ad*) form an xz plane.

The long sides of the rectangle of a section perpendicular to the major axis direction of the light guide member 1 are parallel to the y direction, and the short side surfaces of the rectangle are parallel to the z direction. That is, the total reflection principal surfaces (1*aa* and 1*ac*) are wider than the other two side surfaces (1*ab* and 1*ad*).

The lower bottom surface 1*b* of the light guide member 1 is perpendicular to the four side surfaces 1*a* and forms a yz plane. On the other hand, the light incidence surface 3 of the light guide member 1 has a normal vector having x-direction and z-direction components and is inclined with respect to the lower bottom surface 1*b*.

That is, the normal vector of the light incidence surface 3 passes through one of the pair of total reflection principal surfaces (1*aa* and 1*ac*) of the light guide member 1. In Example 1, the angle φ between the light incidence surface 3 and each total reflection principal surface (1*aa* or 1*ac*) is 30 degrees.

A cubical light extraction portion 4 is provided on one of the total reflection principal surfaces (1*aa* and 1*ac*) of the light guide member 1. The light extraction portion 4 is provided on one of the side surfaces of the light guide member 1 which is near to the lower bottom surface 1*b*.

The light extraction portion 4 is a plate-like member having a refractive index different from that of the light guide member 1. Polymethyl methacrylate resin (PMMA, refractive index 1.49) is used as the light guide member 1, and polycarbonate resin (PC, refractive index 1.59) is used as the light extraction portion 4.

Clad portions 2 are provided on the two side surfaces (1*ab* and 1*ad*) of the light guide member 1 which form the xz plane. The side surfaces (1*ab* and 1*ad*) of the light guide member 1 are covered with the clad portions 2. In Example 1, as shown in FIG. 2B, the clad portions 2 are longer in the y-axis direction than the side surfaces (1*ab* and 1*ad*) of the light guide member 1.

The clad portions 2 are made of a material having a refractive index smaller than that of the light guide member 1. In Example 1, polyfluoro acrylate (PFA, refractive index 1.40) is used as the clad portions 2.

The arrow in FIG. 2A shows an example of the travelling course of light which is emitted from the light source 5, totally reflected repeatedly by the side surfaces (1*aa* and 1*ac*) of the light guide member 1 and goes out from the light extraction portion 4.

In the optical element 30 configured as described above, light is propagated in the pipe 7 and comes into the light guide member 1 from the light incidence surface 3 when the power source 6 is switched on so that light is emitted from the light source 5. The inside of the pipe 7 is filled with air, so that light propagated in the pipe 7 is refracted at the light incidence surface 3 which is a boundary between air and the light guide member 1. The refracted light is totally reflected repeatedly by the side surfaces 1*a* of the light guide member 1.

The arrow in the light guide member 1 in FIG. 3 shows an example of light which is propagated from the far side in the paper plane to the near side in the light guide member 1 while totally reflected repeatedly mainly by the total reflection principal surfaces (1*aa* and 1*ac*).

A part of light propagated in the light guide member 1 is refracted and taken out of the light guide member 1 when it has reached the boundary between the side surface 1*aa* of the light guide member 1 and the light extraction portion 4.

When light comes from the first member to the second member at an angle not smaller than a predetermined incidence angle, it is propagated in the second member while totally reflected. The maximum incidence angle at which total reflection occurs is called critical angle θc. When the incidence angle θ is larger than the critical angle θc, a part of light is refracted and the remaining part of light is reflected. The critical angle θc is defined by Math. 1. In Math. 1, n1 is the refractive index of the first member (air), and n2 is the refractive index of the second member (light guide member 1). As the difference between the refractive indices of two materials on the opposite sides of the boundary becomes large, the critical angle θc at the boundary between the two materials becomes large. That is, as the difference between the refractive indices of two materials becomes large, total reflection at the boundary between the two materials occurs easily.

$$\sin\theta_c = \frac{n_2}{n_1} \qquad \text{[Math. 1]}$$

Of the side surfaces 1a of the light guide member 1, the total reflection principal surfaces (1aa and 1ac) except the light extraction portion 4 are in contact with air. In Example 1, the refractive index of the light guide member 1 is 1.49, and the refractive index of air is 1.0. According to Math. 1, the critical angle θc at which light coming from the light source 5 to the light guide member 1 is totally reflected is about 42 degrees.

In Example 1, because the center line of light emitted from the light source 5 is provided in parallel to the major axis direction of the light guide member 1 so that the center line of light emitted from the light source 5 is included in the range of critical angle θc, light incident on the light guide member 1 is easily totally reflected in the light guide member 1.

Light coming from the light incidence surface 3 into the light guide member 1 is refracted at the light incidence surface 3 to thereby mainly reach the light reflection principal surface 1aa. Then, the light is propagated while totally reflected repeatedly mainly between the total reflection principal surfaces (1aa and 1ac).

Because the pair of total reflection principal surfaces (1aa and 1ac) of the light guide member 1 are parallel to each other, light coming into the light guide member 1 and reaching the total reflection principal surface 1ac is mainly totally reflected by the other total reflection principal surface 1aa. Then, the greater part of light totally reflected by the other total reflection principal surface 1aa is totally reflected by the original total reflection principal surface 1ac again. In this manner, total reflection is repeated between the total reflection principal surfaces (1aa and 1ac). Because the total reflection principal surfaces (1aa and 1ac) generate total reflection easily, the amount of propagated light hardly decreases.

Because the light extraction portion 4 is provided on the total reflection principal surface 1aa, light propagated while totally reflected by the total reflection principal surfaces (1aa and 1ac) can be extracted efficiently.

Because light of the light source 5 has a conical spread, a part of light coming into the light incidence end surface of the light guide member 1 reaches the other two side surfaces (1ab and 1ad). Because the light incidence surface 3 is inclined, light propagated in the light guide member becomes incident on the other two side surfaces (1ab and 1ad) at a very shallow angle, that is, at a large incidence angle. Because the two side surfaces (1ab and 1ad) on which the clad portions 2 are provided are provided in parallel to each other, almost all of light having reached the two side surfaces (1ab and 1ad) on which the clad portions 2 are provided is totally reflected by the two side surfaces (1ab and 1ad). When the light reaches the light extraction portion 4, the light is taken out of the light guide member 1. Because the light loss in the two side surfaces (1ab and 1ad) is very small, light can be extracted efficiently.

The light extraction portion 4 is made of polycarbonate. The refractive index of polycarbonate is 1.59. That is, the refractive index of the light extraction portion 4 is larger than that of the light guide member 1. Accordingly, in a portion of the side surface 1aa of the light guide member 1 on which the light extraction portion 4 is provided, light is refracted and taken out of the light guide member 1.

In this manner, according to Example 1, light totally reflected repeatedly in the light guide member 1 can be extracted from the light extraction portion 4 efficiently.

Measured results using the structure according to Example 1 in the case where efficiency of light coming from the light source 5 into the light guide member 1 and light extraction efficiency indicating efficiency of light emitted from the light source 5 and extracted from the light extraction portion 4 are measured while the refractive index of the clad portions 2 and the angle of the light incidence surface 3 are changed will be described below.

Measurement was made with respect to three kinds of cases where the refractive index of the clad portions 2 was 1.40, the refractive index of the clad portions 2 was 1.45, no clad was provided (the refractive index of the ambient air was 1.0). Measurement was made when the angle of the light incidence surface 3 was an angle φ of 90 degrees and when the angle of the light incidence surface 3 was an angle φ of 30 degrees. When the angle φ of the light incidence surface was 90 degrees, there was shown a reference example in which light from the light source was not refracted toward the total reflection principal surfaces (1aa and 1ac). When the angle φ of the light incidence surface was 30 degrees, there was shown an example in which the large part of light from the light source reached the total reflection principal surfaces (1aa and 1ac) based on refraction at the incidence surfaces. An LED with a light divergence angle of 20 degrees as a full width at half maximum was used as the light source 5, and aluminum was used as the material of the pipe.

TABLE 1

Efficiency of Light Incidence on Light guide member

| Light Incidence Surface Inclination Angle φ | No Clad | Clad Refractive Index 1.40 | Clad Refractive Index 1.45 |
|---|---|---|---|
| 90 degrees | 0.80 | 0.76 | 0.65 |
| 30 degrees | 0.78 | 0.74 | 0.62 |

TABLE 2

Efficiency of Light Extraction from Light guide member

| Light Incidence Surface Inclination Angle φ | No Clad | Clad Refractive Index 1.40 | Clad Refractive Index 1.45 |
|---|---|---|---|
| 90 degrees | 0.05 | 0.05 | 0.05 |
| 30 degrees | 0.20 | 0.20 | 0.17 |

Table 1 shows calculated values of light incidence efficiency in Example 1. In any refractive index of the clad portion 2, light incidence efficiency in the case where the angle φ of the light incidence surface 3 is 30 degrees is little reduced compared with the case where the angle φ of the light incidence surface 3 is 90 degrees (not inclined).

On the other hand, Table 2 shows calculated values of light extraction efficiency in Example 1. In any refractive index of the clad portion 2, light extraction efficiency in the case where the angle φ of the light incidence surface 3 is 30 degrees is improved to three times or more, compared with the case where the angle φ is 90 degrees. That is, when claddings 2 are provided on other surfaces than total reflection principal surfaces which are provided in the light guide member so that light from the light source mainly reaches the total reflection principal surfaces (1aa and 1ac) from the incidence surface, high light extraction efficiency can be obtained even under the presence of the claddings 2. In this manner, in accordance with Example 1, high light extraction efficiency can be obtained even when the claddings 2 are provided on the light guide member 1.

In Example 1, the light incidence surface 3 is inclined in the x direction with respect to the lower bottom surface 1b of the light guide member 1 to thereby increase the probability that light coming into the light guide member 1 will reach the total reflection principal surfaces (1aa and 1ac) compared with the case where the light incidence surface 3 is not inclined. When the amount of light reaching the total reflection principal surfaces (1aa and 1ac) increases, total reflection is then repeated dominantly between the total reflection principal surfaces (1aa and 1ac) so that the amount of light extracted by the light extraction portion 4 increases. That is, by inclining the light incidence surface 3 in the x direction, light extraction efficiency is improved. When the angle $\phi$ between the light incidence surface 3 and each of the total reflection principal surfaces (1aa and 1ac) of the light guide member 1 is not larger than 50 degrees, incidence efficiency indicating efficiency of light which is emitted from the light source 5 and which comes into the light guide member 1 becomes high. Particularly when the angle $\phi$ is about 30 degrees, incidence efficiency is maximized.

When the full width at half maximum of the divergence angle of the light emitted from the light source 5 is not larger than 20 degrees, light incidence efficiency becomes high.

Figure 4A:
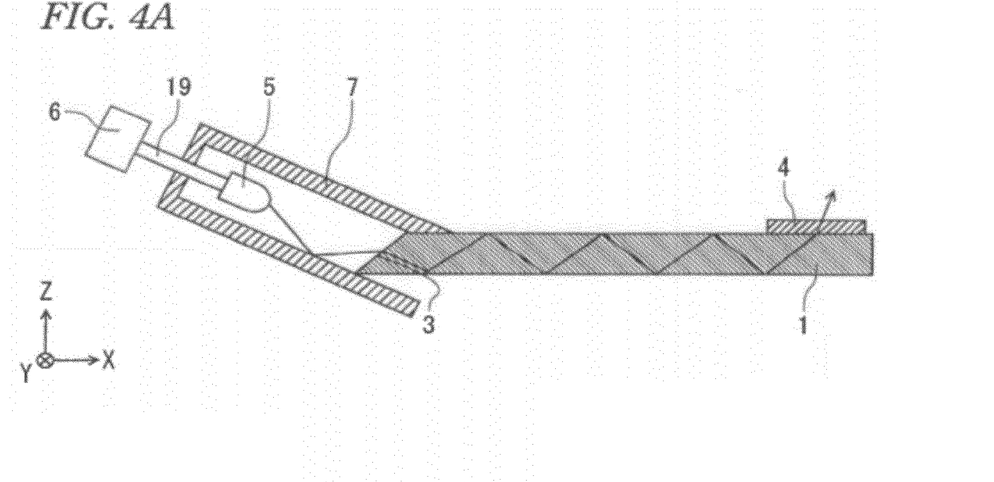
FIG. 4A is a view showing a light incidence surface of a light guide member and the direction of a light source.
Figure 4B:
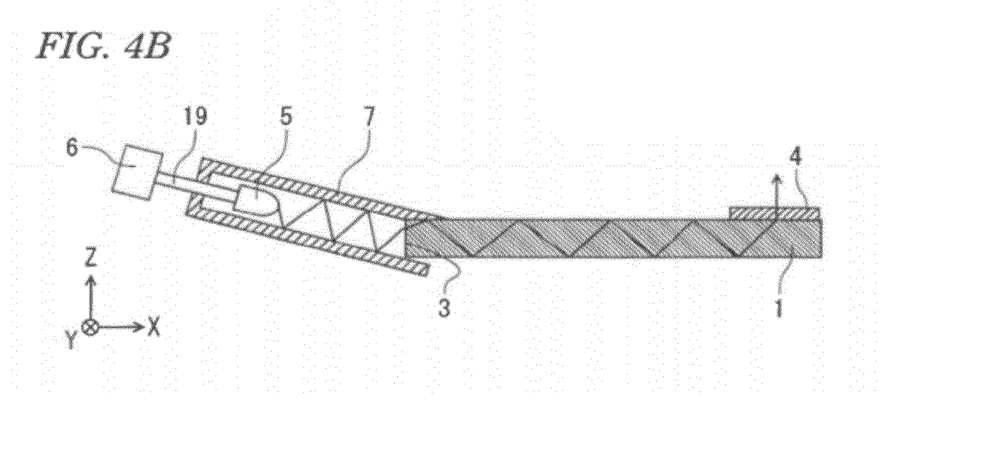
FIG. 4B is a view showing a light incidence surface of a light guide member and the direction of a light source.

FIGS. 4A and 4B are views showing the light incidence surface of the light guide member and the direction of the light source.

The invention can be carried out even when not only the light incidence surface 3 is inclined but also the light source 5 is disposed so as to be inclined in the x direction as the major axis direction of the light guide member 1, as shown in FIG. 4A, so that light incident on the light guide member 1 reaches the total reflection principal surfaces (1aa and 1ac). Moreover, the invention can be carried out even when the light source 5 is disposed so as to be inclined in the x direction as the major axis direction of the light guide member 1 and the light incidence surface 3 of the light guide member 1 is disposed so as to be perpendicular to the side surfaces (1aa, 1ab, 1ac and 1ad), as shown in FIG. 4B.

Although Example 1 has been described in the case where a plate-like member is provided as the light extraction portion 4 on the light guide member 1, another shape can be used as long as a structure in which light propagated in the light guide member 1 can be extracted can be provided by means of forming a notch in one part of the side surface 1aa of the light guide member 1 or roughening one part of the side surface 1aa of the light guide member 1.

Although Example 1 has been described in the case where the light guide member 1 has a section shaped like a rectangular column, the invention can be carried out even when the section is shaped like an almost rectangle. That is, the almost rectangle includes an octagon obtained by slightly cutting four corners of the section of a rectangle, and a figure obtained by smoothening four corners of the section of a rectangle like a curve.

The invention can be carried out even when another shape having a pair of parallel side surfaces without provision of any clad portion 2 is used as the shape of the light guide member 1.

Figure 5A:
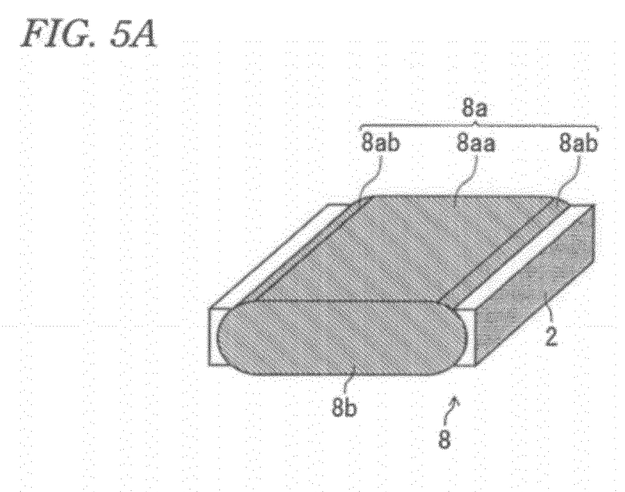
FIG. 5A is a view showing a modification of the section of the light guide member.

FIG. 5A is a view showing a modification of the section of the light guide member. For example, a light guide member 8 has bottom surfaces 8b each constituted by a pair of parallel sides and a pair of curves connecting opposite ends of the pair of parallel sides respectively. The light guide member 8 further has side surfaces 8a constituted by a pair of parallel flat side surfaces 8aa and a pair of curved side surfaces 8ab connecting the pair of parallel flat surfaces. Clad portions 2 are in contact with the curved side surfaces 8ab of the light guide member 8, respectively. The light guide member 8 is provided so that the flat side surfaces 8aa are wider than the curved side surfaces 8ab. Light is totally reflected repeatedly dominantly between the flat side surfaces 8aa. That is, almost of total reflection of light occurs between the flat side surfaces 8aa. Accordingly, the shape of the light guide member 8 permits high light extraction efficiency to be obtained while the clad portions 2 are provided.

Figure 5B:
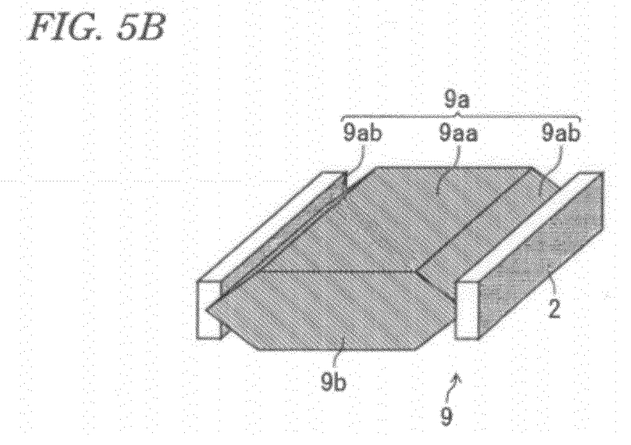
FIG. 5B is a view showing a modification of the section of the light guide member.

FIG. 5B is a view showing another modification of the section of the light guide member. For example, a light guide member 9 is a hexagonal column constituted by a pair of hexagonal bottom surfaces 9b having parallel sides, and six side surfaces 9a provided so as to be perpendicular to the bottom surfaces 9b. The six side surfaces 9a are separated into three pairs of parallel side surfaces 9a (9aa and 9ab). Among the side surfaces 9a, the pair of side surfaces 9aa are large in area. With respect to the other two pairs of side surfaces 9ab small in area in the light guide member 9, one clad portion 2 is provided for adjacent two side surfaces 9ab. That is, in the light guide member 9, two clad portions 2 in total are provided opposite to each other. Light is totally reflected repeatedly dominantly between the side surfaces 9aa large in area. That is, almost of the total reflection of the light occurs between the side surfaces 9aa of the light guide member 9 large in area. Accordingly, the shape of the light guide member 9 can prevent lowering of light extraction efficiency while the clad portions 2 are provided.

In Example 1, because the clad portions 2 are shaped so as to be longer in the y direction than the side surfaces (1ab and 1ad) of the light guide member 1, an air layer can be kept outside the total reflection principal surfaces (1aa and 1ac) of the light guide member 1 in the case where the light guide member 1 is fixed to another member. Accordingly, Example 1 provides a structure desirable to improve light extraction efficiency.

Figure 6:
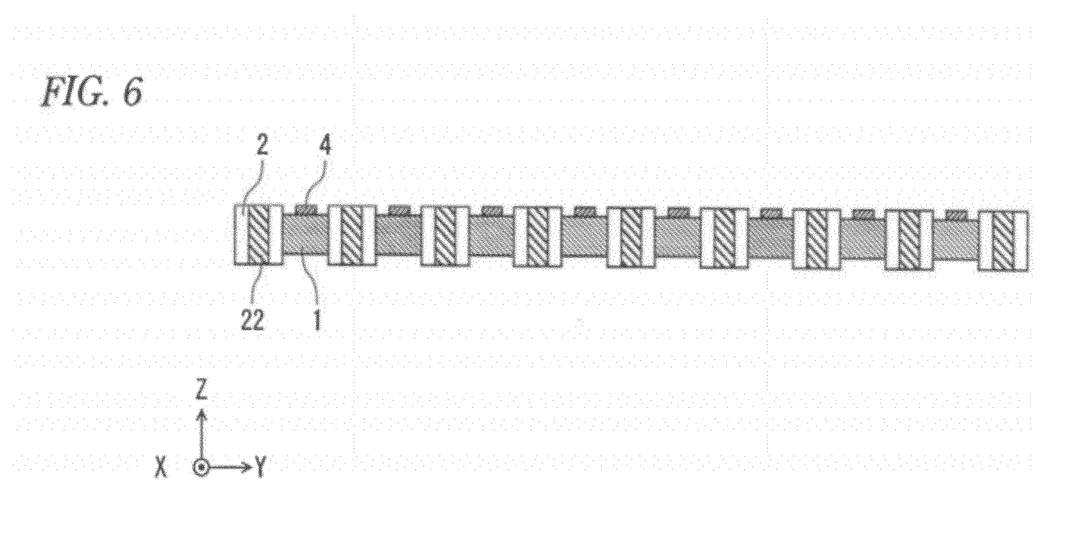
FIG. 6 is a view showing a section of each light guide member in which spacers are provided in clad portions.

Moreover, a light-opaque or light-absorptive spacer can be provided in each clad portion 2. FIG. 6 is a view showing a section of a light guide member in which spacers 22 are provided in clad portions 2. The spacers 22 are provided stratiformly in parallel to the side surfaces (1ab and 1ad) of the light guide member 1 on which the clad portions 2 are provided. Light leaking to the clad portions 2 is absorbed by the spacers 22, so that light leaking from the light guide member 1 is prevented from entering another adjacent light guide member 1. Accordingly, the provision of the spacers 22 can prevent crosstalk from occurring between light rays propagated in a plurality of light guide members 1.

In Example 1, because the lower bottom surface 1b of the light guide member 1 is provided as a specular surface, light not going out of the light guide member 1 from the light extraction portion 4 can be reflected by the lower bottom surface 1b of the light guide member 1 so as to be propagated toward the light extraction portion 4 again. Accordingly, the amount of light reaching the light extraction portion 4 from the light guide member 1 increases compared with the case where the lower bottom surface 1b of the light guide member 1 is not provided as a specular surface, so that light extraction efficiency can be increased.

In the optical element 30 in Example 1, units 20 including light guide members 1 are arranged like a surface and operate as a surface light source. When switching on/off respective power sources 6 is controlled, specific ones of the light sources 5 can be switched on while the other light sources 5 can be switched off. That is, by controlling switching on/off the power sources 6, any position of the optical element 30 can be switched on. For example, when the power sources 6 are controlled so that switched-on light sources 5 and switched-off light sources 5 are alternated, brightness of the optical element 30 can be halved compared with the case where all the light sources 5 are switched on. In this manner, by controlling the power sources 6, brightness of the optical element 30 can be adjusted.

Moreover, a plurality of colors such as red, green, blue, etc. can be arranged as the light sources 5 so that any color can be emitted. For example, light sources for emitting red light, light sources for emitting green light and light sources for emitting blue light are arranged cyclically as the light sources 5. When such light sources 5 are used, the optical element 30 can be switched on at any position and with any color. That is, the optical element 30 can be used for expressing a pattern or motif in colors.

Example 2

Example 2 will be described with reference to FIGS. 7 to 10A.

Example 2 relates to a liquid crystal display device using an optical element according to Example 1 as a backlight. Parts the same as those in Example 1 are referred to by the same signs, and detailed description of the parts will be omitted.

Figure 7A:
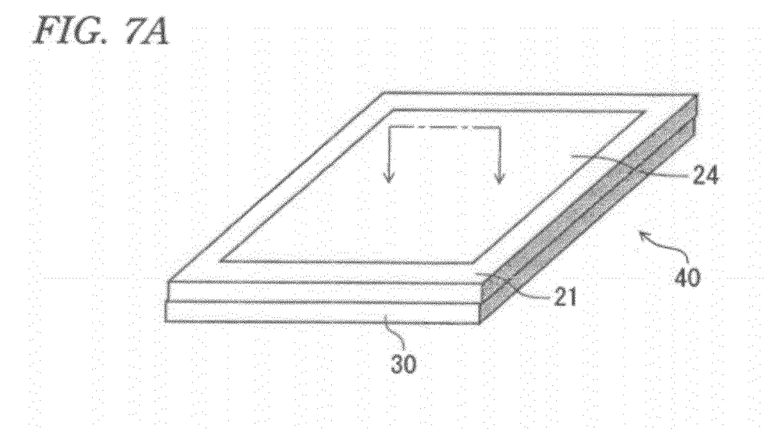
FIG. 7A is a plan view showing a liquid crystal display device according to Example 2 of the invention.
Figure 7B:
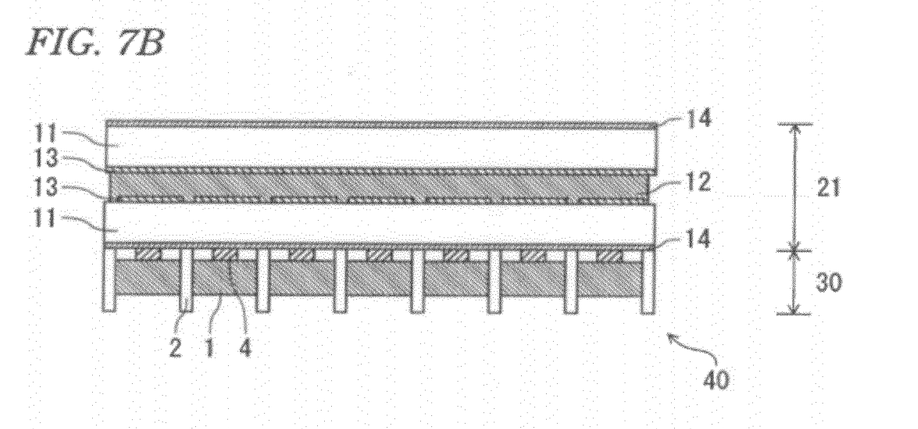
FIG. 7B is a view showing a section of the liquid crystal display device cut along the line D-D in FIG. 7A.

FIG. 7A is a plan view showing a liquid crystal display device according to Example 2 of the invention. FIG. 7B is a view showing a section of the liquid crystal display device cut along the line D-D in FIG. 7A.

As shown in FIG. 7A, the liquid crystal display device includes a liquid crystal panel 21, and a backlight provided on the back of the liquid crystal panel. The liquid crystal panel 21 has a display region 24 in which an image is displayed. The display region 24 has a plurality of pixels.

As shown in FIG. 7B, the liquid crystal panel 21 includes a pair of substrates 11 arranged in parallel to each other, and a liquid crystal layer 22 held between the pair of substrates 11. A transparent electrode 13 for applying a voltage to the liquid crystal layer 12 and an oriented film (not shown) formed on the transparent electrode 13 are provided on a liquid crystal layer 12 side principal surface of each glass substrate 11. A polarizing plate 14 is provided on the other principal surface of each substrate 11.

The optical element 30 described above in Example 1 is used as a backlight. The width of the light guide member 1 is the same as the width of one pixel in the liquid crystal panel 21.

The light extraction portions 4 provided on the light guide members 1 of the optical element 30 are in contact with the liquid crystal panel 21. The light extraction portions 4 of the light guide members 1 may be provided so that one light extraction portion 4 corresponds to one pixel of the liquid crystal panel 21. The clad portions 2 are fixed to the polarizing plate provided in the optical element 30 side substrate 11 of the liquid crystal panel 21.

Figure 8:
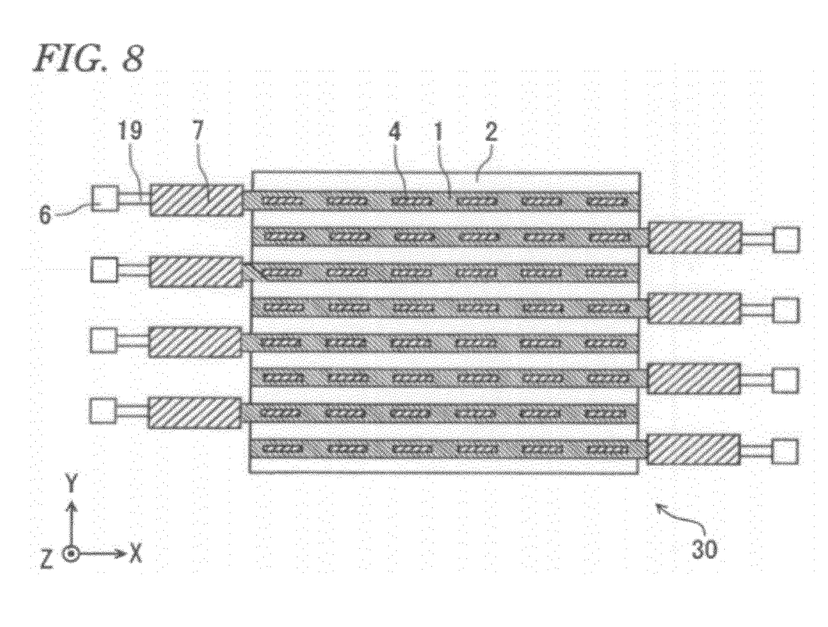
FIG. 8 is a plan view showing a modification of the light guide members of the liquid crystal display device in FIG. 7B.

FIG. 8 is a plan view showing a modification of the light guide members of the liquid crystal display device in FIG. 7B. A plurality of units 20 are arranged alternately in opposite directions and in parallel to one another. In comparison with respect to the light extraction portion 4 provided in one light guide member 1, the amount of light going out of the light extraction portion 4 near to the light source is large. Accordingly, by configuring the optical element 30 as shown in FIG. 8, light intensity distributions in the $\underline{x}$ direction can be averaged among the light guide members 1.

Light propagated in each light guide member 1 is propagated while totally reflected repeatedly mainly by the total reflection principal surfaces (1*aa* and 1*ac*). For this reason, the greater part of light refracted at the light extraction portion 4 of the light guide member 1 is propagated in a direction perpendicular to the liquid crystal panel 21. That is, light going out from the light extraction portion 4 of the light guide member 1 is highly directive in the direction perpendicular to the liquid crystal panel 21. For this reason, light extracted from a light extraction portion 4 is efficiently irradiated onto a pixel being in contact with the light extraction portion 4 but hardly enters ambient pixels other than the pixel connected to the light extraction portion 4.

When the light sources 5 are controlled, light can be irradiated onto any pixel because light can be extracted from any light extraction portion 4. That is, light can be irradiated only onto pixels through which light needs to be transmitted. Accordingly, the liquid crystal display device 40 can be driven with power saving and contrast is improved compared with the case where light is irradiated onto all pixels in the display region 24.

The light-emitting element used in the display device according to Example 2 is so high in light extraction efficiency that a high luminance liquid crystal display device can be obtained according to Example 2.

Example 3

Example 3 will be described with reference to FIGS. 9 to 10B. Example 3 uses the optical element according to Example 1 as a display device. Example 3 is different from Example 1 in the structure of each light extraction portion of the light guide member. Parts the same as those in Example 1 are referred to by the same signs and detailed description of the parts will be omitted.

Figure 9:
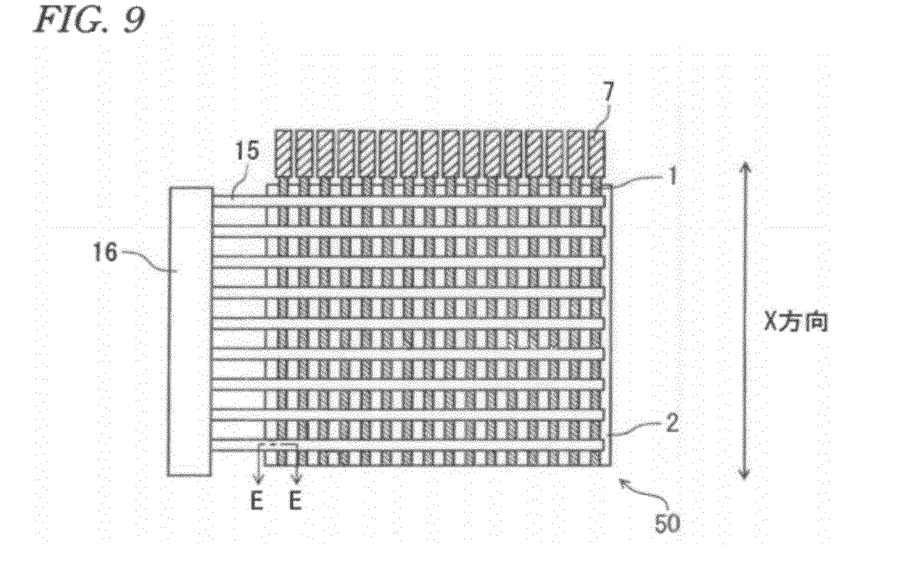
FIG. 9 is a plan view showing a display device according to Example 3 of the invention.

FIG. 9 is a plan view showing a display device according to Example 3 of the invention. In the display device 50, units 20 including light sources 5 and light guide members 1 are arranged in parallel to one another. A scanning line driving circuit 16 and scanning lines 15 connected to the scanning line driving circuit 16 are provided on one principal surface of the units 20. The scanning lines 15 are arranged so as to be parallel to one another and perpendicular to the major axis direction of the light guide members 1. Though not shown in FIG. 9, power sources 6 are connected to pipes 7 through connection members 19.

Figure 10A:
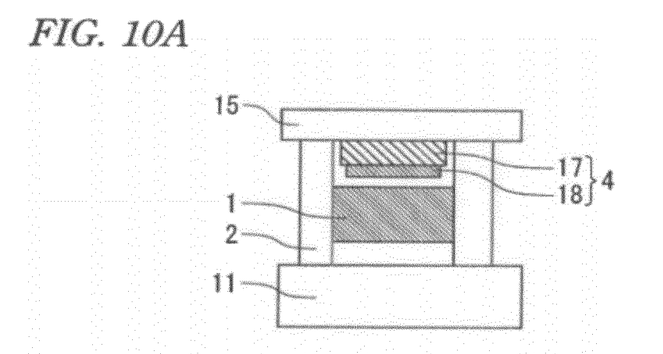
FIG. 10A is an enlarged view showing a section of the display device cut along the line E-E in FIG. 9.
Figure 10B:
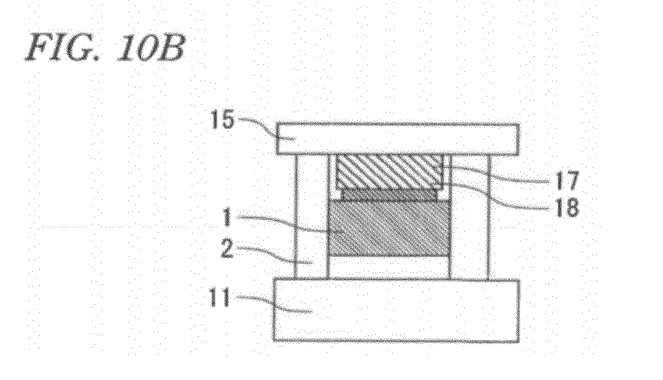
FIG. 10B is an enlarged view showing a section of the display device cut along the line E-E in FIG. 9.

FIGS. 10A and 10B are enlarged views showing a section of the display device cut along the line E-E in FIG. 9.

As shown in FIG. 10A, a light extraction portion 4 is provided at a portion of intersection between a light guide member 1 and a scanning line 15. The light extraction portion 4 includes a piezoelectric element 17 and a scattering film 18. The piezoelectric element 17 is provided on a light guide member 1 side of the scanning line 15. The scattering film 18 is provided on a light guide member 1 side of the piezoelectric element 17. A gap is formed between the scattering film 18 and the light guide member 1. The light guide member 1 is fixed above the substrate 11 by the clad portion 2. In an initial state, the light guide member 1 and the scattering film 18 are not in contact with each other.

When an electric signal is outputted from the scanning line driving circuit 16, the electric signal is transmitted to the scanning line 15. The piezoelectric element 17 is expanded on the light guide member side by the electric signal transmitted to the scanning line 15 so that the scattering film 18 comes into contact with the light guide member 1 as shown in FIG. 10B. That is, when an electric signal is applied on the scanning line 15, the light extraction portion 4 comes into contact with the light guide member 1. When light is emitted from the light source 5 on this occasion, one part of light propagated in the light guide member 1 and having reached the light extraction portion 4 being in contact with the light guide member 1 is scattered by the scattering film 18 and leaks to the glass substrate 11 side. In this manner, when the scanning line driving circuit 16 is used for controlling the voltage applied on the scanning line 15 to thereby control opening/closing of the light extraction portion 4, determination can be made as to whether light passing through the light guide member 1 is to be extracted at a point of intersection between the scanning line 15 and the light guide member 1 or not.

Moreover, by controlling the amount and color of light of each light source 5, the amount and color of light extracted from the light extraction portion 4 can be changed.

According to Example 3, by controlling the amount and color of light as to whether light is to be extracted from each light extraction portion 4 or not, an image can be displayed.

According to Example 3, efficiency of light extraction from each light extraction portion 4 is so high that a high luminance display device can be obtained.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A light-emitting element comprising:
   a light source;
   a light guide member having a columnar shape and comprising a plurality of side surfaces containing a pair of parallel total reflection principal surfaces and other surfaces than the total reflection principal surfaces, an upper bottom surface disposed so that light from the light source reaches the total reflection principal surfaces, and a lower bottom surface disposed opposite to the upper bottom surface;
   clad portions provided on the other side surfaces of the light guide member than the total reflection principal surfaces, the clad portions having a smaller refractive index than that of the light guide member;
   air layers provided on the total reflection principal surfaces; and
   a light extraction portion provided on one part of the total reflection principal surfaces;
   wherein the upper bottom surface is inclined with respect to a direction perpendicular to the side surfaces of the light guide member so that a vector normal to this surface would extend through the total reflection principal surface of the light guide member;
   wherein the light source is disposed so that light is emitted in a major axis direction parallel to the side surfaces of the light guide member.

2. The light-emitting element according to claim 1, wherein the light source emits light when a full width at half maximum of a light divergence angle is not larger than 20 degrees, and the angle between the upper bottom surface of the light guide member and each total reflection principal surface is not larger than 50 degrees.

3. The light-emitting element according to claim 2, wherein a section of the light guide member perpendicular to the major axis direction is shaped like an almost rectangle.

4. The light-emitting element according to claim 3, wherein:
   the total reflection principal surfaces are side surfaces forming long sides of the section of the light guide member; and
   the clad portions are provided on side surfaces forming the short sides of the section.

5. The light-emitting element according to claim 4, wherein a plurality of the light guide members are disposed through the clad portions so that the major axis directions of the side surfaces are parallel to one another.

6. The light-emitting element according to claim 5, wherein the angle between the direction of the emission of the light source and the major axis direction of each light guide member is smaller than 90 degrees.

7. The light-emitting element according to claim 5, wherein each of the clad portions has a light-opaque spacer.

8. A display device comprising:
   a light-emitting element including light guide members each having a columnar shape and comprising a plurality of side surfaces containing a pair of parallel total reflection principal surfaces and other surfaces than the total reflection principal surfaces, an upper bottom surface disposed so that light from the light source reaches the total reflection principal surfaces, and a lower bottom surface disposed opposite to the upper bottom surface, clad portions provided on the other side surfaces of each light guide member than the total reflection principal surfaces, the clad portions having a smaller refractive index than that of the light guide member, and air layers provided on the total reflection principal surfaces, the light guide members being disposed through the clad portions so that major axis directions of the side surfaces are parallel to one another;
   a scanning line driving circuit configured to send an electric signal;
   scanning lines which intersect the light guide members perpendicularly and which are connected to the scanning line driving circuit so that the electric signal is transmitted through the scanning lines; and
   light extraction portions provided at points of perpendicular intersection between the scanning lines and the light guide members so that light extraction from the light guide members is controlled in accordance with the electric signal transmitted through the scanning lines;
   wherein the upper bottom surface is inclined with respect to a direction perpendicular to the side surfaces of the light guide member so that a vector normal to this surface would extend through the total reflection principal surface of the light guide member;
   wherein the light-emitting element is disposed so that light is emitted in a major axis direction parallel to the side surfaces of the light guide member.

* * * * *